UNITED STATES PATENT OFFICE.

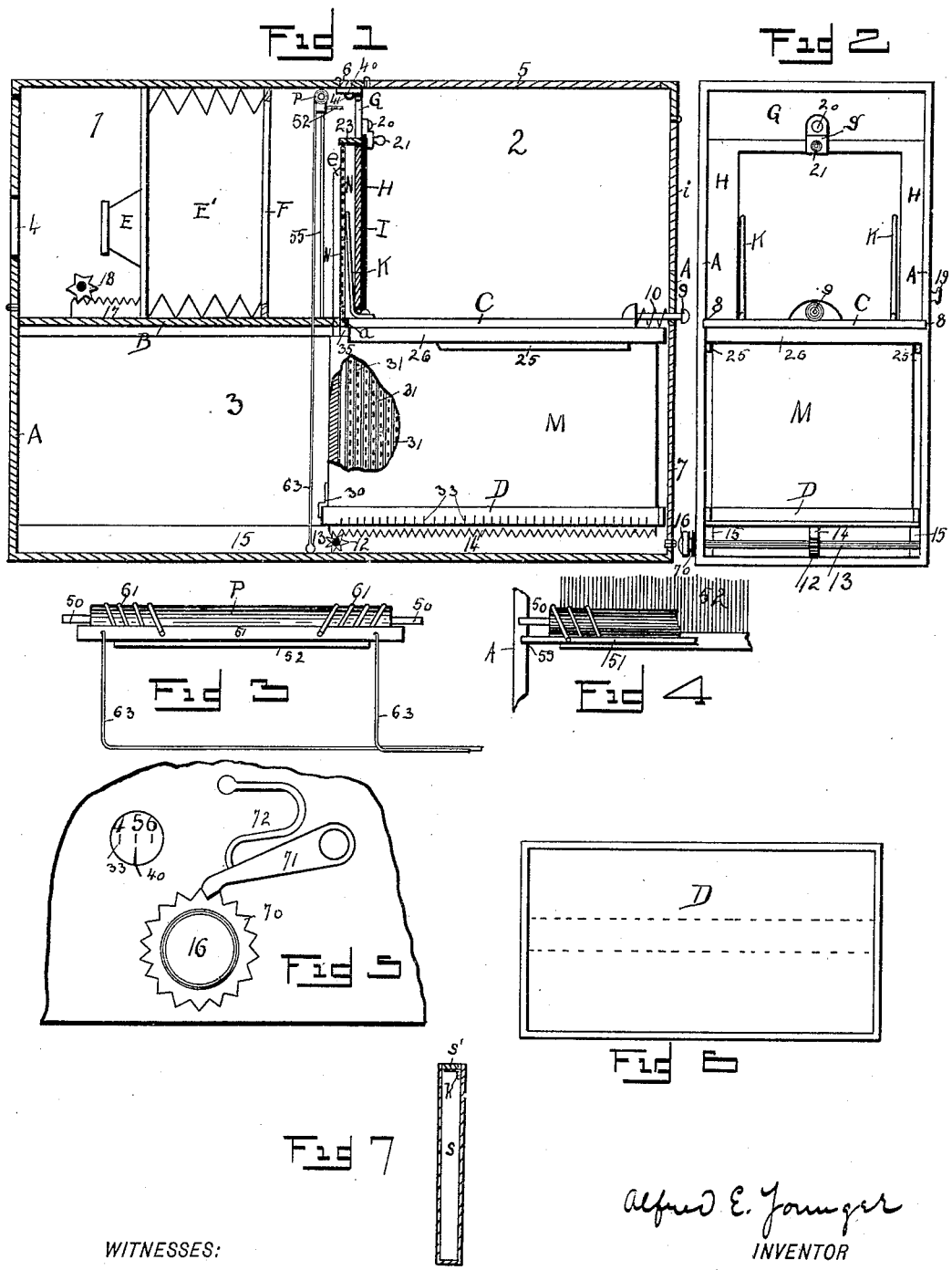

ALFRED E. YOUNGER, OF OMAHA, NEBRASKA.

MAGAZINE-CAMERA.

SPECIFICATION forming part of Letters Patent No. 552,570, dated January 7, 1896.

Application filed April 4, 1895. Serial No. 544,388. (No model.)

*To all whom it may concern:*

Be it known that I, ALFRED E. YOUNGER, residing at Omaha, in the county of Douglas and State of Nebraska, have invented certain useful Improvements in Cameras; and I do hereby declare that the following is a full, clear, and exact description of the invention, such as will enable others skilled in the art to which it appertains to make and use the same, reference being had to the accompanying drawings, which form a part of this specification.

This invention has relation to a new and novel improvement in magazine-cameras.

The object of my invention is to provide a light portable camera that shall be provided with a magazine so that a number of plates can be fed from said magazine into a plate-holder, and after being exposed are again permitted to escape into said magazine.

In the accompanying drawings, Figure 1 shows a sectional view of a camera embodying my invention. Fig. 2 is a rear end view with the back removed. Fig. 3 shows a front view of the dusting-brush. Fig. 4 is a top view thereof. Fig. 5 shows a side view of the shifting thumb-piece and the indicator. Fig. 6 shows a top view of the shifting tray, while Fig. 7 shows a side view of a plate-holder as used in my invention.

A in the drawings represents a suitable camera-box of any suitable size and material, which is preferably divided into three chambers, comprising the upper forward chamber 1, the rear chamber 2 and the lower magazine-chamber 3.

The camera is provided in front with the lens-opening 4, above with the hinged door 5 and the stub-door 6 and upon the rear with the door 7. These doors are suitably hinged to the camera proper. The chamber 1 is divided from the chamber 3 by means of the transverse central partition B, which, however, extends approximately but half across the camera, the remaining portion of this partition continuing and being formed by means of the sliding deck C, which deck, as shown in Fig. 2, works within the grooves 8 8, within the side of the camera A proper. This deck is provided further with a projecting stem 9, said stem being further provided upon the inside with a spring 10 working at the rear against the camera A. This deck upon its end is provided with a felt strip $a$, as shown in Fig. 1. The transverse wall B ends at a suitable point and by drawing the deck C outward a suitable space can be formed between this deck C and the wall B.

Secured within the forward chamber 1, at the end of the wall B, are two guide-strips $e$, which extend from the wall B upward. Positioned within the lower chamber 3 is a pinion 12 mounted upon the shaft 13, which pinion works within a rack 14 secured to the bottom of a tray D. This tray is supported upon two strips 15 15 within the bottom of the housing, as is shown in Figs. 1 and 2. These strips 15 extend the full length of the lower chamber and aid to support this tray D. The tray can be reciprocated within this lower chamber by means of the shaft 13 and rack and pinion 14 and 12, the shaft 13 being provided upon the outside with the operating thumb-screw 16, as is clearly shown in Fig. 5.

Within the upper forward chamber is an ordinary camera comprising the forward lens-holder E, which is connected by means of an ordinary bellows E' to a frame F within this box, which frame is, of course, provided with a suitable opening and merely aids in holding the bellows. In front the lens-holder is provided with a rack 17 and pinion 18, which pinion is provided upon the outside with a thumb-piece 19, so that this lens-holder can be properly focused.

Dividing the chambers 1 and 2 above is a strip G provided with a swinging holder $g$, which holder is secured by means of a screw 20 and is provided with an operating-knob 21. Working against this strip G is a ground-glass holder H, which has no bottom, but supports the ground glass I, as is shown in Fig. 1. In Fig. 2 this ground glass is removed, the frame H alone being shown. This ground-glass holder is provided with a projecting strip 23 which projects inward, as is shown in Fig. 1, and beyond the wall B above, and also extending beyond the strip, as clearly shown in Fig. 1.

Secured to the deck C are two ordinary upwardly-extending springs K, the upward end of each being forced forward. Secured within the lower chamber 3, and within one end of the same, are two supporting-strips 25 25, which strips are adapted to support the cover 26, forming part of the magazine M, as is shown in Figs. 1 and 2. This magazine comprises an ordinary box approximately half the length of the chamber 3, and which box, by means of a rectangular bar 30, is removably secured to the sliding tray D. This magazine is provided with a number of strips 31 31, which are adapted to keep the plates apart while they are held in the magazine. The tray D is provided with a number of lines 33 33, there being one line for each space between the strips 31 31, or, in other words, there being a line for each plate-space within the box. In Fig. 5 these lines 33 are numbered, so that each plate-space is numbered.

At a suitable point within the chamber 3 is a stub-stop 35, against which the cover 26 abuts when the magazine M is placed within the tray D within the magazine-chamber 3.

Now, in the operation of my device after the magazine has been properly positioned within the chamber, the rack 14 would be engaged by the pinion 12 to adjustably hold the magazine M. As soon as this magazine has been carried into the chamber, so that the first line 33 upon the tray came opposite the indicator 40, as is shown in Fig. 6, the magazine M would have been fed forward a certain distance, but without the cover 26, which cover would have been arrested by means of the stop 35, so that there would have been an open space formed between the cover 26 and the bottom B. The camera, in the meantime, would have been properly focused, the rear lid I for this purpose having been opened, so that an unobstructed view of the ground glass would have been obtained. The camera would then be reversed so that the magazine M would come on top, which would permit the escape of the first plate, (marked N in the drawings,) which would then fall into the space between the chambers 1 and 2, pressing the springs K outward and falling upon the projection 23 of the ground-glass holder H. The strips e would have guided the plate upon one side in front and the springs K K upon the rear. Before this plate would have been permitted to fall within said chamber it would, however, have been necessary to draw the deck C outward by means of the operating-stem 9, because this deck C normally abuts against the wall B and closes this opening, so that, practically, the first operation of the plate would be to fall upon the deck C and, as this deck is drawn outward, would have been permitted to escape and fall upon the projecting frame 23 of the ground-glass holder H. In this position the plate would be securely held, when the photograph could be taken. The sizes of the plates are preferably so made that they are held between the holder C and the wall B while resting upon the projection 23, so that they are securely held in position by means of the sliding deck C, which impinges said plate between its forward end and the wall B. As soon as the plate has been exposed it is simply necessary to draw the stem 9 outward, whereupon the plate promptly drops into its position within the magazine, the camera being reversed when a plate is fed into the holder.

To expose the second plate the magazine is fed forward by means of the operating-button 16, so that the second mark 33 comes opposite the indicator, when the second plate is permitted to escape into the holder after the stem 9 is drawn out, the first plate, however, in the meantime resting upon the wall B, which is made to take the place of the cover 26 as the magazine is fed forward, so that only one plate is permitted to shift, the remaining ones being held within the magazine by the cover 26 and the wall B. The numerals, as shown in Fig. 6, enable the operator to keep a memorandum of the plates, so that he can easily tell which subject number 5, for instance, relates to. It often happens, however, that the operator wishes to remove a certain plate from the magazine. This would be accomplished by removing the ground-glass holder H and opening the stub-door 6, below which would be positioned a felt light-obstructing strip 40, held in position by means of a spring 41. This holder comprises an ordinary narrow box of metal or any other suitable material, which at its upper end is provided with the hinged top $s'$, which is spring-actuated. Should it be desired to remove a plate that had just been exposed, it is simply necessary to insert this holder, with the door downward, through the narrow opening 6, so as to slide over the exposed plate. The camera is then inverted and the handle E drawn outward, so that the plate will fall into the holder. As the plate falls into the holder the spring-actuated top will close, so as to form a light tight receptacle. The holder is then removed, upon which the spring-actuated strip 40 is carried into its properly-closed position.

In Fig. 7 $s$ represents one end of the box and $k$ an ordinary leaf-spring by means of which the top $s'$ is secured to the holder.

To remove any dust from the plate I provide an ordinary spring-roll P, which is provided with the projecting stems 50, working within the side of the camera. This spring-roll is similar to those used for window-curtains and below is provided with a guide-bar 51, to which an ordinary camel's-hair brush 52 is secured, as is shown in Figs. 3 and 4. Within the side of the camera is provided a groove 55, (more clearly shown in Fig. 1,) within which the bar 51 slides, this bar being used simply as a guide to properly hold the brush 52. To this bar is properly connected the roll P by means of the cords 61. Extending from the bar 51 are two operating-cords 63 63, which are led through the opening within the camera to without, passing through the opening 13, through which opening the ends of these cords project, and upon drawing these cords outward the brush 52 is drawn downward, so that it sweeps the negative. As soon as the cord is released, the spring, of course, promptly draws the brush into its upper position, as is shown in Fig. 1.

To prevent any unnecessary movement of the tray D, I provide the shaft 13 with a ratchet 70, (referring now to Fig. 5,) adapted to be engaged by a pawl 71, operated upon by an ordinary spring 72. This ratchet 70 is scalloped, so that it can be readily moved either forward or backward to permit the escape of the pawl 71.

The device is compact and the parts all accessible and readily operated.

Now, having thus described my said invention, what I claim as new, and wish to secure by United States Letters Patent, is—

1. In a camera, the combination of the fixed partition, B, the sliding spring actuated partition C, the springs K, K, the removable ground glass holder H provided with the outwardly projecting stop 23, the guide strips e and the reciprocating plate holding magazine, all substantially as and for the purpose set forth.

2. In a camera, the combination of the fixed partition B, the sliding spring actuated partition C, the springs K, K, secured to said partition C, the removable ground glass holder H, provided with the outwardly projecting stop 23, the guide strips e, e terminating below an opening within said camera, the stub door 6, closing said opening and the light-obstructing spring actuated strip 4, all substantially as and for the purpose set forth.

3. In a camera, the combination of the fixed partition B, the sliding spring actuated partition C, the springs K, K, the removable ground glass holder H, provided with the outwardly projecting stop 23, the negative-holding guide strips e, e, the spring actuated roll P, the brush 52, secured to said spring actuated roller P, the strand 61, and the operating strands 63, secured to said brush 52, all arranged substantially as and for the purpose set forth.

In testimony whereof I affix my signature in presence of two witnesses.

ALFRED E. YOUNGER.

Witnesses:
ELMER G. STARR,
G. W. SUES.